Jan. 18, 1955     H. S. BROWN ET AL     2,699,636
ROTARY LAWN MOWER

Filed Nov. 2, 1953     3 Sheets-Sheet 3

United States Patent Office 2,699,636
Patented Jan. 18, 1955

2,699,636

ROTARY LAWN MOWER

Hugh S. Brown, Wauwatosa, and Leo J. Lechtenberg, Milwaukee, Wis., assignors to Briggs & Stratton Corporation, Milwaukee, Wis., a corporation of Delaware Application November 2, 1953, Serial No. 389,784

7 Claims. (Cl. 56—25.4)

This invention relates to rotary lawn mowers and has more particular reference to rotary lawn mowers of the type which are powered by a small air-cooled internal combustion engine.

The chief characteristics of such rotary lawn mowers are that they are provided with an elongated horizontal cutter blade, and a so called horizontal engine which is mounted on the mower chassis with its crankshaft disposed vertically. The lower end of the crankshaft projects from the engine crankcase and, of course, is drivingly connected with the mid portion of the cutter blade to revolve the blade in a plane parallel with and close to the ground over which the lawn mower is propelled.

For the sake of safety to humans and animals, rotary power lawn mowers of the type herein concerned are also provided with a depending skirt which surrounds the cutter blade in spaced relationship to its orbit. The skirt, however, has another function, namely to act as a shield which largely prevents the rapidly revolving cutter blade from striking stones or other objects on the lawn which might otherwise result in serious damage to the engine or the cutter blade, or both.

Despite the employment of such protective skirts or shields, which are never 100% effective, it has been customary in the past to provide an impositive driving connection between the engine crankshaft and the cutter blade, which connection is disrupted in the event the rapidly revolving blade strikes some object which could result in injury to the engine or the blade. This impositive driving connection usually comprises some form of slip clutch or other torque transmitting device which relies upon friction alone to normally maintain the cutter blade drivingly connected with the crankshaft.

Needless to say, such slip clutches or other impositive torque transmitting devices, when improperly adjusted or worn, can provide a constant source of irritation due to accidental slippage or even failure to yield as intended upon the cutter blade striking some object on the lawn. A further objection to the use of slip clutches and the like is that they not only constitute an additional manufacturing expense but also complicate the assembly of the cutter blade to the crankshaft.

With these objections in mind it is the purpose of this invention to provide a rotary power lawn mower of the character described in which the slip clutch or other impositive torque transmitting device in the connection between the cutter blade and the engine crankshaft may be eliminated without subjecting the engine or the cutter blade to serious damage in the event the blade strikes some object on a lawn being mowed.

More specifically it is a purpose of this invention to provide a power lawn mower of the character described wherein the cutter blade is at all times positively drivingly connected with the engine crankshaft, but wherein the inertia of the crankshaft is held to the minimum which is sufficient to assure smooth operation of the engine, so that the engine will be readily stopped without damage thereto in the event of accidental interference with the rotation of the cutter blade.

As stated, the cutter blade in the rotary lawn mower of this invention is at all times positively drivingly connected to the lower projecting end of the engine crankshaft, and it is a feature of this invention that the cutter blade, in effect, provides the flywheel of the engine. In other words, the internal combustion engine for the rotary lawn mower of this invention differs from the conventional in that it does not have a conventional flywheel mounted on the upper projecting end of its crankshaft, but instead is provided with a light-weight air impeller rotor which adds but little weight to the crankshaft, and of itself, is incapable of providing the crankshaft with inertia sufficient to assure smooth operation of the engine.

A further purpose of this invention resides in the provision of an improved connection between a rope starter pulley and the upper end of the engine crankshaft, which connection is unusually secure and features inter-engaging parts on the pulley and the air impeller rotor connecting the same together at areas spaced a substantial radial distance from the crankshaft.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which.

Figure 1:
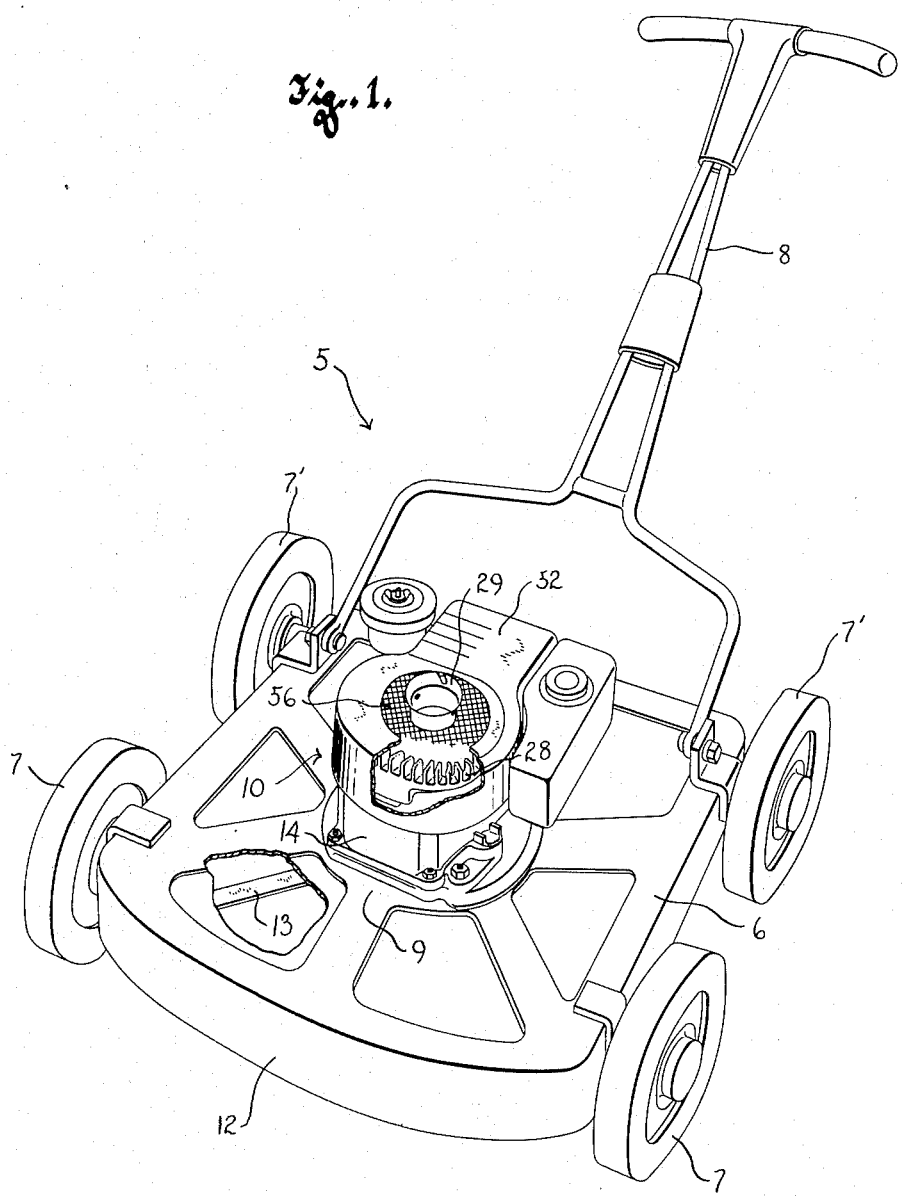
Figure 1 is a perspective view of the rotary power lawn mower of this invention with parts broken away and shown in section.

Referring now more particularly to the accompanying drawings in which like reference characters designate like parts throughout the several views, the numeral 5 generally indicates a rotary power lawn motor embodying the features of this invention. The lawn mower has been shown as of a conventional type having a chassis 6 supported by pairs of front and back wheels 7 and 7' respectively, and a rearwardly extending handle 8 by which the lawn mower may be manually pushed.

The chassis further includes a horizontal platform or engine support 9 upon which a small air-cooled internal combustion engine 10 is mounted. The engine is of the so called horizontal type in that its crankshaft 11 is disposed to rotate about a vertical axis. A skirt or shield 12 fixed to the chassis extends vertically downwardly from the edges thereof, and the lower edge of the skirt terminates in a plane close to ground level. The skirt, of course, serves as a protective housing surrounding the cutter blade 13.

The cutter is an elongated substantially flat blade or bar having its mid portion attached to the crankshaft. For this purpose, the crankshaft projects downwardly from the crankcase 14 of the engine, through the engine supporting platform 9 and into the space within the housing defined by the skirt 12; and as will appear from the more detailed description to follow, the cutter blade is carried by the crankshaft with the plane of its flat sides normal to the crankshaft axis and parallel to the engine supporting platform 9. The length of the blade, of course, is such that its orbit is spaced just inside the surrounding skirt 12, across the narrow dimension of the chassis 6.

It will also be appreciated that the cutter blade revolves in a plane which is substantially no closer to ground level than the plane of the lower edge of the skirt 12, so that the skirt will thus afford the best possible protection against stones or other objects on the lawn coming into contact with the rapidly rotating blade.

According to this invention the cutter blade is positively connected to the lower end of the crankshaft to be at all times driven thereby. For this purpose the center portion of the blade has a hub 16 fixed thereto, at the upper side of the blade, and the hub is provided with a tapered bore 17 to fit a correspondingly tapered seat 18 on the lower projecting end portion of the crankshaft. The seat 18, of course, tapers uniformly toward the lower extremity of the crankshaft, and preferably has a key slot to receive a key 19. The key projects radially outwardly into a similar key slot, not shown, in the hub 16 of the cutter blade, and while the key thus forms a part of the non-rotatable driving connection between the hub and the crankshaft, its primary function is to locate the cutter blade angularly with respect to the crankshaft.

The positive rotation transmitting connection between the hub 16 of the cutter blade and the lower end of the crankshaft is afforded by the wedge-like fit of the hub on the tapered seat 18, and to at all times assure that the hub will be properly wedged in place on the seat 18, a retaining screw 21 is threaded axially into the lower end of the crankshaft and has its head bearing against the underside of the hub to force the same axially upwardly as far as possible onto the tapered seat 18.

Figure 2:
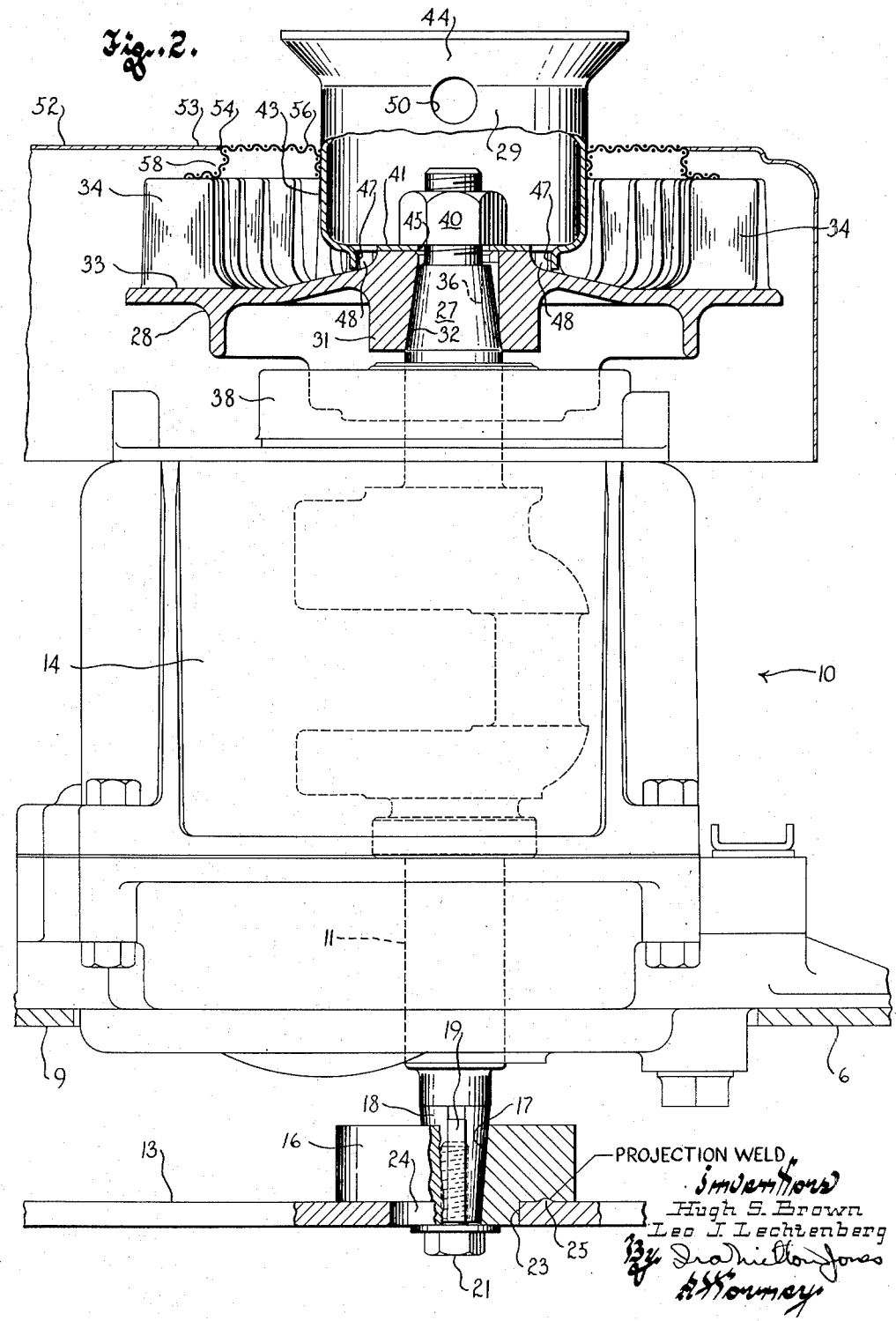
Figure 2 is an enlarged side view of the engine of the lawn mower with parts broken away and shown in section.
Figure 3:
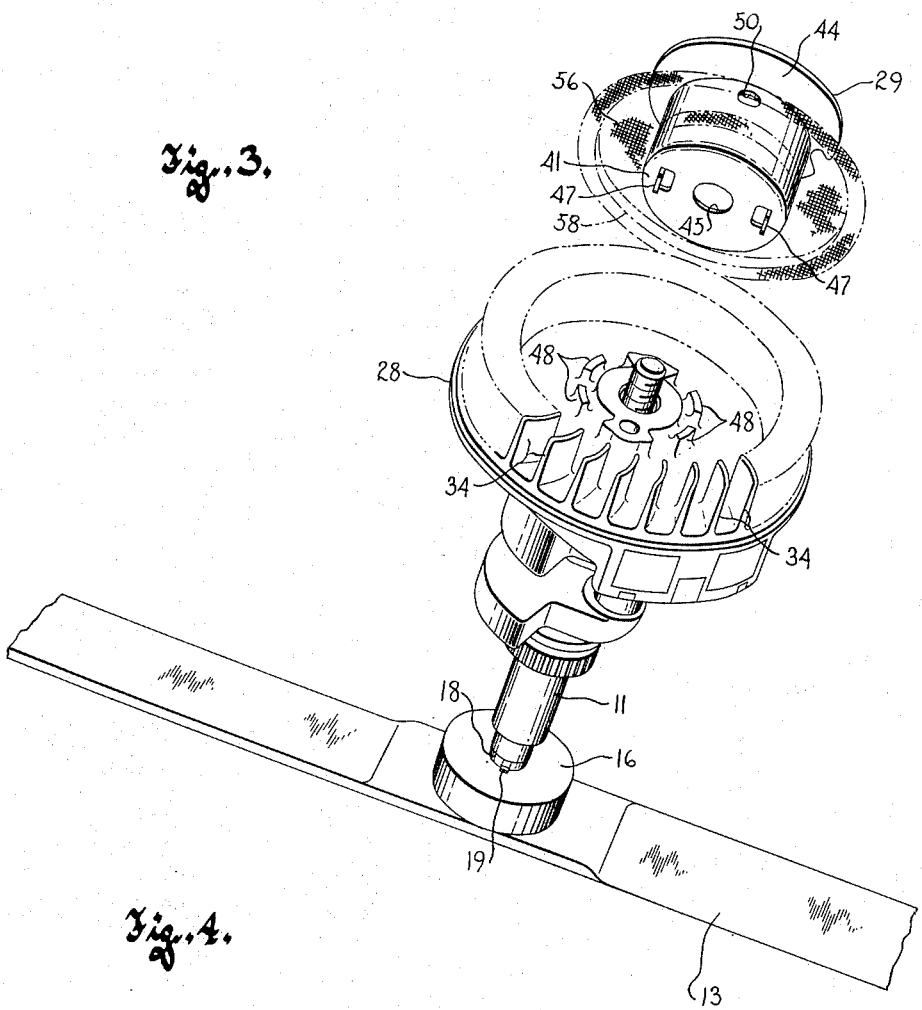
Figure 3 is a fragmentary perspective view illustrating the manner in which the cutter blade, the air impeller rotor and the rope starter pulley are secured to the engine crankshaft.

As indicated in Figure 2 the blade preferably has a hole 23 in its center portion to receive a locating boss 24 on the underside of the hub, and the blade is permanently secured to the hub as by projection welding, indicated at 25.

The upper end portion of the crankshaft likewise projects out of the engine crankcase and has a tapered seat 27 machined thereon inwardly of the extreme end portion of the shaft, which in this case is externally screw threaded. Fixed to the upper end of the crankshaft is an air impeller rotor 28 for cooling the engine, and a rope starter pulley 29 which facilitates manual starting of the engine.

The air impeller rotor 28 is preferably a light-weight aluminum die casting having a hub 31 provided with a bore 32 tapered to fit the tapered seat 27 on the upper end of the crankshaft, and a flange-like web 33 extending radially outwardly from the hub. The impeller is of the centrifugal type having a multitude of upstanding circumferentially spaced vanes 34 near its periphery, the vanes being more or less radially disposed with respect to the axis of the hub.

The air impeller rotor is positively drivingly connected to the upper end of the crankshaft mainly by the wedge-like fit of the hub 31 on the tapered seat 27 of the crankshaft, but in order to assure accurate angular positioning of the rotor on the crankshaft the hub is further keyed to the crankshaft as by a key 36. The need for accurately locating the air impeller rotor angularly with respect to the crankshaft arises from the fact that the rotor forms part of the magneto mechanism of the engine, having the permanent magnets, not shown, of the magneto attached to its underside. The stationary mechanism 38 of the magneto assembly is mounted on the top of the crankcase, directly beneath the air impeller rotor.

The same retaining device 40 which is employed to hold the rope starter pulley 29 upon the upper end of the crankshaft also serves to hold the hub of the air impeller rotor tightly wedged on the tapered seat 27 of the crankshaft. This retaining element comprises a nut threaded over the upper extremity of the crankshaft against the bottom wall 41 of the cup-like rope starter pulley, which it will be noted seats upon the axially outwardly facing end of the hub 31. Thus when the nut is tightened the hub is firmly wedged onto its seat.

The rope starter pulley has a cylindrical side wall 43 projecting upwardly from the periphery of the bottom wall 41 and of a diameter slightly larger than that of the hub 31; and the side wall terminates in an outwardly flaring lip 44. The bottom wall 41 of the pulley cup, of course, has a central hole 45 therein through which the threaded upper extremity of the crankshaft projects.

A novel axially separable driving connection is provided between the rope starter pulley and the engine crankshaft. This driving connection is provided by a pair of diametrically opposite tabs 47 struck downwardly from the bottom wall of the pulley cup near the periphery thereof so as to be located a considerable distance radially outwardly from the axis of the crankshaft and the edge of the hole 45 in the bottom wall 41. The tabs 47, in fact, are spaced radially outwardly from the hub of the air impeller rotor and more or less flatwise face one another.

These tabs are edgewise received between pairs of circumferentially spaced upstanding lugs 48 on the web of the air impeller rotor to thereby form in effect a jaw clutch connection between the pulley cup and the air impeller rotor, and through the latter with the engine crankshaft. Since the connection between the pulley cup and the air impeller rotor is axially separable, it is maintained operative by the retaining nut 40 which holds the bottom of the cup firmly clamped against the axially outer face of the rotor hub 31.

The particular driving connection described between the rope starter pulley and the shaft is advantageous particularly by reason of the fact that the tabs 47 are located remote from the engine crankshaft and are not nearly so apt to tear off as frequently occurred in the past, as when a similar tab was struck from the portion of the bottom wall of the cup directly adjacent to the hole therein and was received in a slot in the exterior of the engine crankshaft.

It is another feature of this invention that means is provided at each end of the crankshaft to facilitate manual holding of the shaft during tightening of the retaining member at the opposite end of the shaft. To illustrate, the crankshaft may be readily held against rotation by a workman holding the cutter bar 13 during tightening of the retaining nut 40 at the upper end of the crankshaft, and the rope starter pulley itself provides means by which the crankshaft may be held against rotation during tightening of the retaining screw 21 on the lower end of the crankshaft. For this purpose the cylindrical side wall of the pulley cup is provided with diametrically opposite holes 50, near the junction of the side wall with the flared lip 44, into which a bar or lever may be inserted and by which the crankshaft may be held against rotation during tightening of the retaining screw 21 on the lower end of the crankshaft.

The air impeller rotor, of course, is enclosed within a more or less conventional blower housing 52 fixed to the upper portion of the engine crankcase. The blower housing has a relatively flat top wall 53 substantially normal to the axis of the crankshaft and spaced a slight distance above the upper edges of the vanes 34 on the air impeller. The wall 53 has a large circular hole 54 therein coaxially with the crankshaft and through which the rope starter pulley projects with its side wall in radially spaced relation to the edge of the hole. This space provides an annular air inlet port into the blower housing through which air is drawn by the impeller during operation of the engine, to be directed over the cooling fins, not shown, on the engine cylinder.

In order to guard against grass clippings or particles of other foreign material entering the air inlet port, the rope starter pulley has an annular screen 56 fixed to its side wall and extending entirely across the annular space between it and the edge of the air inlet hole 54 in the blower housing, substantially flush with the top wall 53 thereof. Since the screen rotates with the crankshaft, it will have a tendency to throw off grass clippings and the like that may alight thereon, by centrifugal force, to prevent the entry of such matter into the blower housing while at the same time permitting air to be freely drawn into the blower housing through the screen.

Attention is directed to the fact that the outer edge portion of the annular screen is bent downwardly and then outwardly as at 58 to rest upon the axial outer edges of the vanes 34 on the impeller. It is to be understood that the screen will be held against the vanes in this fashion, under tension, when the retaining nut 40 is drawn tight to clamp the pulley cup against the hub of the impeller.

From the description thus far it will be apparent that the internal combustion engine has no flywheel per se, and that the cutter blade 13 which is fixed to the lower end of the crankshaft, in effect, provides the flywheel of the engine. The air impeller 28 alone has insufficient weight to provide the crankshaft with inertia sufficient to assure smooth operation of the engine, and the rope starter pulley, being a light-weight sheet metal stamping, adds practically nothing to the inertia of the crankshaft.

Hence it will be seen that the cutter blade 13 provides almost all of the additional weight necessary for smooth operation of the engine, and that the inertia of the crankshaft may be held to the minimum value necessary to smoothly carry the crankshaft through the successive piston strokes. Therefore, the engine may be brought to a sudden stop in the event of interference with rotation of the cutter blade, without any danger of damaging the engine.

Figure 4:
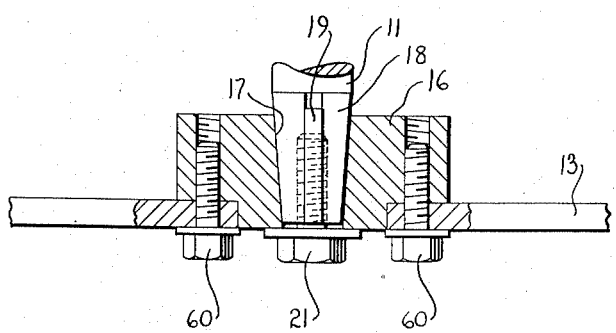
Figure 4 is an enlarged elevational view with parts broken away and shown in section illustrating another way of positively securing the cutter blade to the lower end of the crankshaft.

While the hub 16 has been described as being welded to the center portion of the cutter blade, an equally effective manner of securing the hub to the blade is illustrated in Figure 4 wherein a pair of screws 60 passing upwardly through the blade near the central hole therein and threading into tapped holes in the hub 16 serve to detachably fix the cutter blade to the hub. This latter form of connection between the hub and the blade has the advantage of enabling a new cutter blade to be secured to the hub without requiring an entirely new blade and hub assembly to be substituted for the old one.

From the foregoing description taken together with the accompanying drawings it will be readily apparent to those skilled in the art that this invention eliminates the need for slip clutches or other frictional torque transmitting devices in the connection between the cutter blade of a rotary lawn mower and the crankshaft of the engine by which the lawn mower is powered, without endangering the engine or the blade in the event of interference with the rapidly rotating blade. It will also be apparent that this invention greatly simplifies the connection and disconnection of the cutter blade to the engine crankshaft in the event that it becomes necessary to replace the blade.

What we claim as our invention is:

1. In a rotary power lawn mower: an air-cooled internal combustion engine having a crankshaft rotatable about a vertical axis; a lightweight air impeller rotor fixed on the upper end of the crankshaft for cooling the engine, and having a weight less than that necessary to provide the crankshaft with inertia sufficient to assure smooth operation of the engine; and an elongated horizontal cutter blade positively fixed to the lower end of the crankshaft to be at all times drivingly connected therewith; said cutter blade in effect providing the flywheel of the engine.

2. In a rotary power lawn mower: an air-cooled internal combustion engine having a crankshaft rotatable about a vertical axis; an elongated horizontal cutter blade on the lower end of the crank shaft; means providing a rotation transmitting connection between the cutter blade and the lower end of the crankshaft through which the cutter blade is at all times positively driven by the crankshaft, said means including a retaining member screw threaded axially onto the lower end of the crankshaft for preventing axial displacement of the cutter blade therefrom; a rope starter pulley fixed on the upper end of the crankshaft; and means on said rope starter pulley to facilitate manual holding of the crankshaft against rotation during tightening of the said screw threaded retaining means.

3. The rotary power lawn mower set forth in claim 2 wherein said rope starter pulley has a cylindrical side wall concentric with the axis of the crankshaft, and wherein said side wall of the pulley is provided with diametrically opposite holes to receive a bar, whereby said holes provide the means for facilitating manual holding of the crankshaft during tightening of said screw threaded retaining member.

4. In a rotary power lawn mower: an air-cooled internal combustion engine having a crankshaft rotatable about a vertical axis; a light-weight air impeller rotor having a hub encircling the upper end portion of the crankshaft a distance inwardly from the extremity of said upper end portion of the crankshaft; an axially separable driving connection between the hub of the rotor and the upper end portion of the crankshaft; a lightweight cup-like rope starter pulley on the upper end portion of the crankshaft, axially outwardly of the rotor hub and smaller in diameter than the rotor, said pulley having a centrally apertured bottom wall seated upon the outer face of the rotor hub and through which the outer end portion of the crankshaft projects, and a cylindrical side wall concentric to the axis of the crankshaft and projecting axially outwardly from the rotor hub; means on the upper end of the crankshaft, inside the pulley cup, exerting an axial inward force on the bottom wall of the pulley cup to clamp the same against the rotor hub and thereby prevent outward axial displacement of the rotor and pulley from said upper end portion of the crankshaft; the combined weights of the rotor and pulley being less than that necessary to provide the crankshaft with inertia sufficient to assure smooth operation of the engine; and an elongated horizontal cutter bar fixed to the lower end portion of the crankshaft to be at all times positively drivingly connected therewith, said cutter bar, in effect, providing the flywheel of the engine.

5. In a rotary power lawn mower: an air-cooled internal combustion engine having a crankcase, a crankshaft rotatable about a vertical axis with its opposite upper and lower ends projecting a distance from the crankcase and each having a portion which is uniformly taperingly reduced in diameter toward the adjacent extremity of the shaft; a light-weight air impeller rotor on the upper projecting end of the crankshaft; means drivingly connecting the rotor with the crankshaft including a hub provided with a bore tapered to have a wedging fit with the adjacent tapered portion of the crankshaft, and a retaining member screw threaded axially onto said upper end of the crankshaft and exerting an axial inward force on the hub of the rotor to hold the same tightly wedged onto said upper tapered portion of the shaft; an elongated horizontal cutter blade on the lower projecting end of the crankshaft; means at all times drivingly connecting the cutter blade with the lower end of the crankshaft including a hub on the blade fixed with respect thereto and having a bore tapered to have a wedging fit with the adjacent tapered portion on the shaft, and a retaining member screw threaded axially onto said lower end of the shaft and exerting an axial inward force on the blade hub to hold the same tightly wedged onto said lower tapered portion of the shaft, said cutter blade, in effect, providing the flywheel of the engine and affording a lever by which the crankshaft may be manually held against rotation during tightening of said retaining member on the upper end of the shaft; and means on the upper end of the shaft for facilitating manual holding of the crankshaft against rotation during tightening of said retaining member on the lower end of the shaft.

6. The rotary power lawn mower set forth in claim 5 wherein said last named means comprises a cup-like rope starter pulley fixed on the upper end of the crankshaft and having a bottom wall seated upon the rotor hub at the face thereof remote from the crankcase, with a central hole in said bottom wall through which the upper end portion of the shaft projects, and having a cylindrical side wall projecting axially outwardly from the rotor hub and concentric to the axis of the crankshaft, said side wall having diametrically opposite holes therein through which a tool may be inserted to enable the crankshaft to be held against rotation during tightening of the retaining member on the lower end of the crankshaft.

7. The rotary power lawn mower set forth in claim 6, further characterized by the fact that the upper retaining member comprises a nut screw threaded onto the upper end of the shaft, inside the pulley cup, and serves to clamp the bottom wall of the pulley cup against the rotor hub to prevent outward axial displacement of both the rotor and pulley from the shaft.

References Cited in the file of this patent
UNITED STATES PATENTS

| Number | Name | Date |
|---|---|---|
| 2,198,526 | Cockburn | Apr. 23, 1940 |
| 2,446,920 | Goldberg | Aug. 10, 1948 |
| 2,501,470 | Krueger et al. | Mar. 21, 1950 |
| 2,504,416 | Hileman | Apr. 18, 1950 |
| 2,519,936 | Sayre et al. | Aug. 22, 1950 |
| 2,675,662 | Kroll | Apr. 20, 1954 |